United States Patent [19]

Kikinis

[11] Patent Number: 5,721,958
[45] Date of Patent: Feb. 24, 1998

[54] APPARATUS AND METHOD FOR PERIPHERAL DEVICE CONTROL WITH INTEGRATED DATA COMPRESSION

[75] Inventor: Dan Kikinis, Saratoga, Calif.

[73] Assignee: Elonex I.P. Holdings, London, United Kingdom

[21] Appl. No.: 759,186

[22] Filed: Dec. 4, 1996

Related U.S. Application Data

[62] Division of Ser. No. 420,284, Apr. 11, 1995, Pat. No. 5,655,138.
[51] Int. Cl.⁶ .................................................. G06F 3/00
[52] U.S. Cl. .......................... 395/888; 395/523; 382/233
[58] Field of Search ....................... 395/800.01, 888, 395/200.76, 200.77, 827, 828, 835, 882, 884, 891, 100, 103, 101, 110, 523; 382/232, 233, 235, 254

[56] References Cited

U.S. PATENT DOCUMENTS 5,349,647  9/1994  Freiburg et al. .................. 395/115
5,379,351  1/1995  Fandrianto et al. ............... 382/236
5,402,518  3/1995  Lowery ........................... 395/2.1
5,404,437  4/1995  Nguyen .......................... 395/806

Primary Examiner—Alpesh M. Shah
Attorney, Agent, or Firm—Donald R. Boys

[57] ABSTRACT

An apparatus and methods are provided for pre-compressing data to be sent to a peripheral device in a computer system, sending the data to the peripheral device as a compressed data stream, and decompressing the data for use in the peripheral device in a real-time format. In a preferred embodiment, a unique peripheral device controller is provided having a data handling and decompression pipeline for receiving and decompressing an incoming compressed data stream in concert with a state machine for sensing the states of elements of the peripheral device, and for providing the decompressed data stream to data-using elements of the peripheral device. The peripheral device can be any device for which large amounts of data are typically needed, including, but not limited to printers, video displays, robotic driving devices, and data recording and media writing devices. Alternative methods are disclosed for compressing and decompressing data in systems according to the invention.

5 Claims, 5 Drawing Sheets

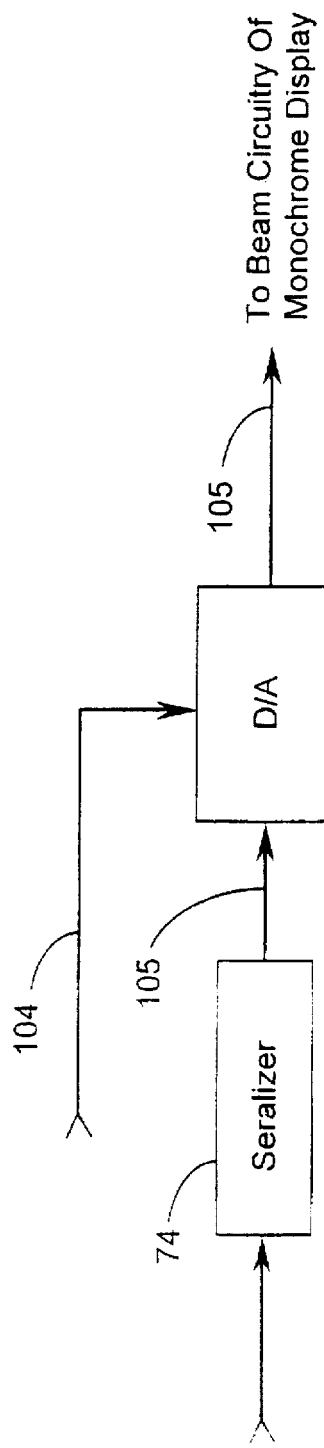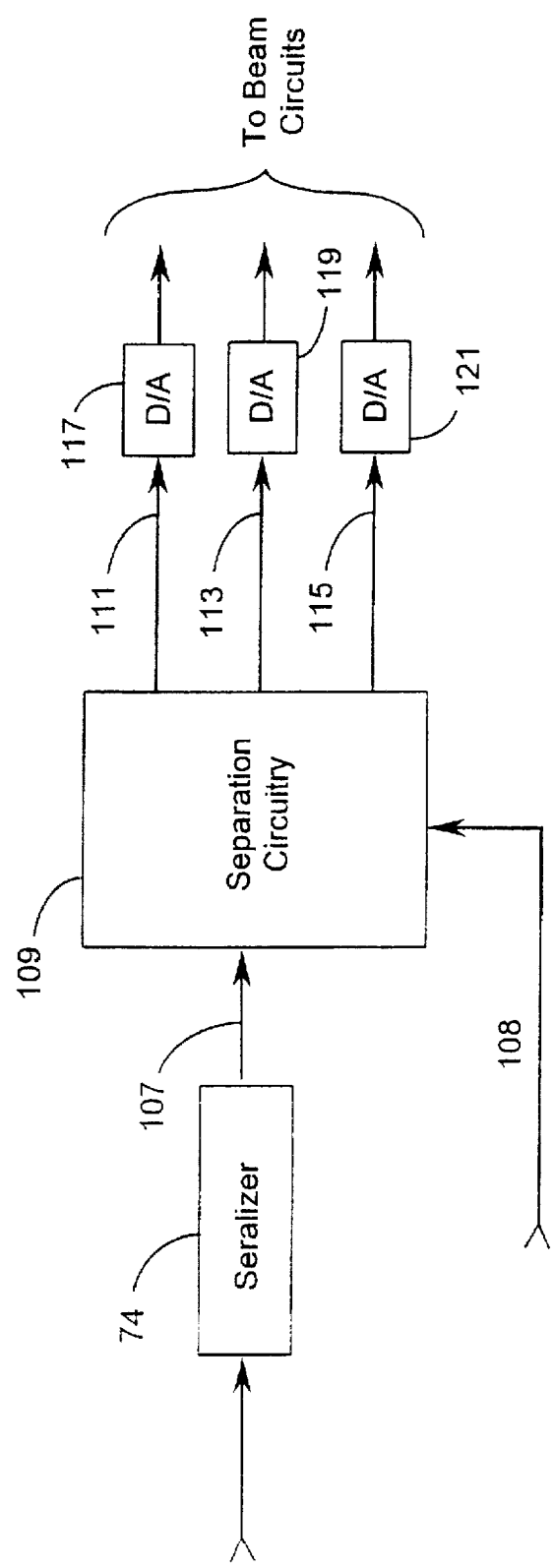

APPARATUS AND METHOD FOR PERIPHERAL DEVICE CONTROL WITH INTEGRATED DATA COMPRESSION

CROSS REFERENCE TO RELATED DOCUMENTS

The present invention is a divisional application of application Ser. No. 08/420,284, filed Apr. 11, 1995 now U.S. Pat. No. 5,655,138.

FIELD OF THE INVENTION

The present invention is in the area of apparatus and methods for communication between a host computer and peripheral devices, such as scanners, printers, and video displays, and pertains more particularly to host operation with devices that require relatively large mounts of data transfer from the host to the peripheral device.

BACKGROUND OF THE INVENTION

Data communication between a host computer, such as an IBM-compatible desktop or laptop computer, and a peripheral device, such as, for example, a laser printer or a video display, is a process largely defined and limited by the hardware and control processes of both the host computer and the peripheral device. Many standards and nominal standards have been set in these areas. For example, the process of driving a laser printer from an IBM-compatible host via a Centronics™ twenty-five conductor cable and twenty-five pin connectors having 8-bit parallel data transfer is very well known, and provides a convenient illustration for the state of the art in such communications, as well as of the problems and limitations in the art.

The Winn L. Rosch Hardware Bible, Copyright 1992 by Winn L. Rosch and published by Brady Publishing of New York, N.Y. competently describes the IBM/Centronics parallel printer port protocol as the subject of Chapter 15, incorporated herein by reference.

There are, of course, many other data transfer devices and protocols used for data transfer between a host and a peripheral device. Among them are the industry-standard RS-232 serial link; a Universal Serial Bus™; an industry-standard Centronics™-compatible parallel port; a proprietary parallel port; an enhanced parallel port; a Small Computer Serial Interface (SCSI) bus; infra-red communication; a local area network (LAN) protocol such as Ethernet™; a wide-area network; telephone modem connection; and an Integrated Services Digital Network (ISDN) link.

Each of the data transfer schemes briefly mentioned above has certain advantages and disadvantages related to various purposes. A Centronics-type parallel port, for example is limited in the distance over which it may be used, partly because of voltage cross-talk between parallel conductors in the link. For longer distances, serial systems are more useful, though slower; and for very long distances, telephone modem links and wireless systems such as microwave systems have certain advantages.

The details of all of these data communication systems are well-known in the art and exhaustively detailed in many reference works in the possession of the inventor at the time of this invention, and also freely available to others. These include the Wirm L. Rosch Hardware Bible mentioned above is one such comprehensive reference. Another, for example, is Microprocessor-Based design by Michael Slater, Copyright 1989 by Prentice-Hall of Englewood, N.J. Another source of comprehensive information for the various available and widely-used data transfer systems is data sheets provided by various manufacturers for products marketed to provide functions of the type described above.

It is well known in the art that computers continue to be developed and marketed that are faster and more powerful than their predecessors. Where operation at a frequency of 16 megahertz was relatively quick just two years before the present invention, computers operating at 66 megahertz and faster are very common now; and even faster computers are entering the marketplace.

It is also well known in the art that peripheral devices, such as printers and video displays, among many other types, continue to be developed with innovations and enhancements that demand progressively greater amounts of memory. For example, the direction of improvement in both video displays and printers is to higher resolution. A higher dot density produces a better and clearer picture. And higher resolution means more dots (pixels) to be printed or displayed. Progressively more data is required for higher quality and bigger pictures.

While more data has to be to be transferred, the time available for the transfer does not necessarily change. For example, in video display, the picture has to be formed in real time. If a new display frame requires ten times the data that an older display technology requires for a frame, then the data must be transferred at ten times the rate for the new display as was needed for the older technology.

Unfortunately, while a peripheral may be improved, and a host may be capable of faster operation, in most cases the hardware and the process of data transfer from the host to the peripheral has not been significantly improved. As a result, ever-increasing amounts of storage may be needed at either or both ends of the data transfer, and the data link between the two, including the memory system and the CPU of the host, may well be bandwidth limited.

What is clearly needed is a significantly improved apparatus and method for transferring data, including control commands, between a host computer its peripheral devices. Such apparatus and methods need to be capable of reducing memory and bandwidth requirements while providing for operation of data-hungry peripherals in real time, at the same time not significantly increasing complexity and cost.

SUMMARY OF THE INVENTION

In a preferred embodiment, a peripheral device controller is provided comprising a state machine having inputs for monitoring status from sensors of the peripheral device and outputs for providing such as start and ready signals; receiving circuitry connected to an incoming port and to the state machine; a data handling and decompression pipeline circuit connected to the receiving circuitry; and a data serializer connected to the data handling and decompression pipeline circuit and to an output port. The receiving circuitry latches data words from the incoming port, and provides the data words to the data handling and decompression pipeline circuit on receipt of ready signals from the state machine. The data handling and decompression circuitry then decompresses the incoming data stream and provides a resulting decorepressed data stream to the data serializer. Finally, the data serializer provides the serialized data stream to the output port.

In various embodiments of the invention, host computers connected to peripheral devices in a variety of ways compress dam to be passed to the peripheral devices, and pass the data as a compressed dam stream. Unique peripheral controllers in the peripheral devices receive the compressed data stream, decompress it, and provide a decorepressed data stream to the data-using elements of the peripheral device.

Data may be compressed according to the invention, and provided to the peripherals, in at least two unique ways, detailed below, and the peripheral devices can be any of a broad variety of devices, such as dam recorders, printers, media writers, video displays and the like.

A unique advantage of the invention is that the necessary bandwidth of the CPU, the memory system, and other control elements in the host is significantly reduced, and the bandwidth required of the data link to the peripheral device in each case is also significantly reduced.

BRIEF DESCRIPTION OF THE DRAWINGS

FIG. 5A is a block diagram illustrating digital-to-analog conversion for a data stream to control a CRT monochrome display in an embodiment of the invention.

FIG. 5B is a block diagram illustrating separation circuitry and D/A conversion to control beam circuits for a color CRT display.

DESCRIPTION OF THE PREFERRED EMBODIMENTS

Figure 1:
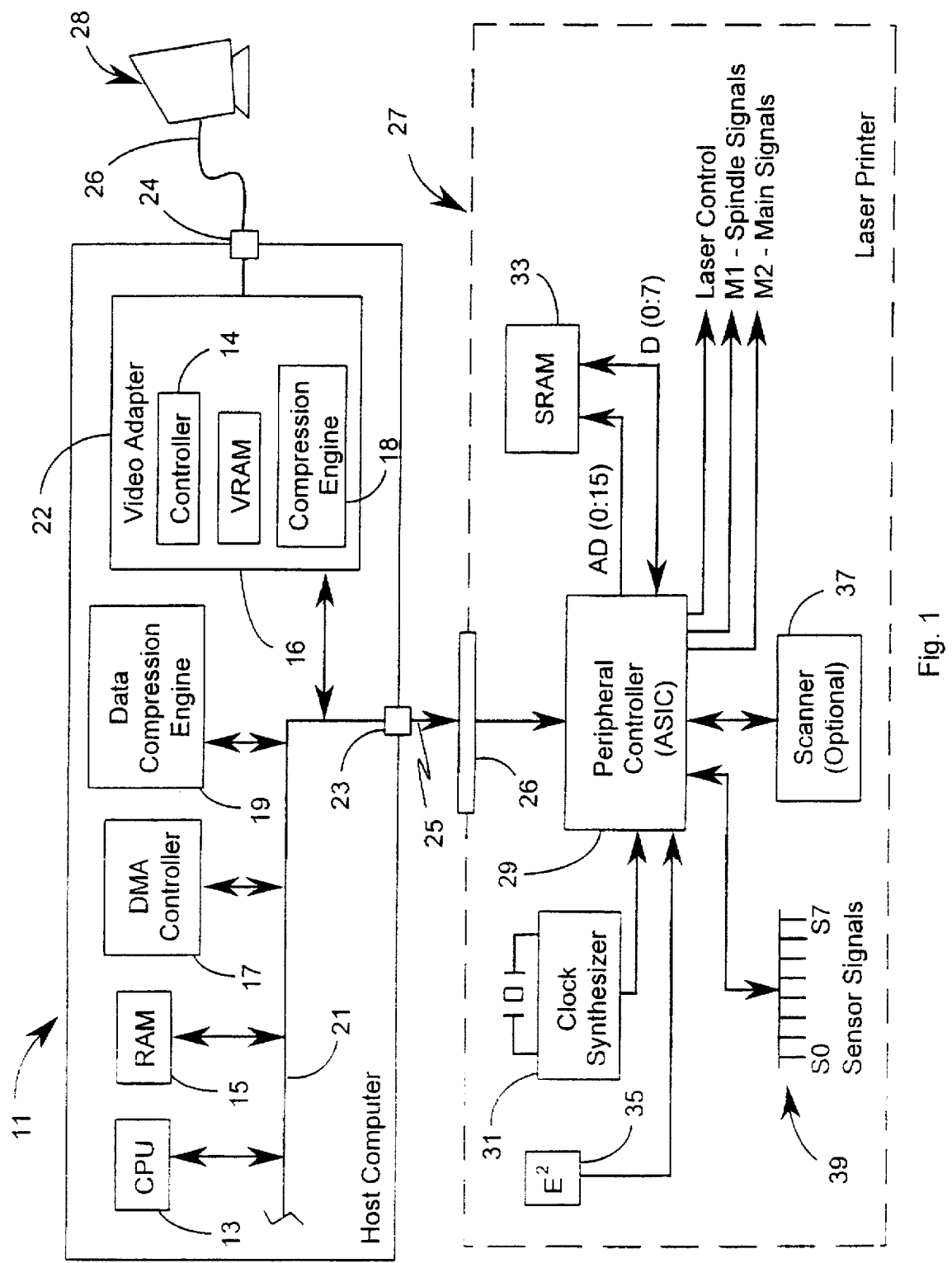
FIG. 1 is a block diagram of a host computer, including a data handling system, connected to a laser printer and a video display according to an embodiment of the present invention.

FIG. 1 is a block diagram of a host computer connected to a laser printer, including a data handling system, according to an embodiment of the present invention. A host computer 11 represents any one of a large number of possible hosts, such as a desktop personal computer, a laptop or notebook model, or even a hand-held device, among many other sorts. Computer 11 has a CPU 13, a random access memory (RAM) 15, a direct memory access (DMA) controller 17, a broadly illustrated data compression engine 19, and a video display adapter 22, all interconnected by a parallel bus 21. A communication port 23 is also connected to bus 21, and provides data and control communication over a data link 25 to a peripheral device. Video display adapter 22 in an embodiment of the present invention, has a video controller 14, a video RAM 16, a compression engine (either hardware or software or a combination) 18, and a dedicated port 24 through which data is transferred over a data link 26 to a video display 28. The video display adapter may be implemented as an expansion add-in card, or in other ways, such as dedicated circuitry in a portable computer. The data link may be any one of several known links, including the well-known Video Graphics Array (VGA) link. Also, the display can be any one of a variety of video displays, such as a CRT, or one of the several sorts of flat-panel displays available in the industry. For use with the present invention, the display must be adapted to a peripheral controller according to an embodiment of the present invention.

In the example illustrated by FIG. 1, the peripheral device is a laser printer 27, and data link 25 engages an interface 26 at the laser printer case. The data stream passed through data link 25 passes through interface 26 to elements internal to the laser printer, which are described more fully below.

It will be apparent to those with skill in the art that host computer 11 is represented in somewhat generic form, and there are many alternative arrangements for the elements represented. There are similarly many kinds of CPUs that might be used, many alternative RAM arrangements, many sorts of buses with different operation schemes, and so forth. Also, data compression engine 19 may be a software application, a hardware-based compression engine, or a combination of both. A number of suitable compression engines are known in the art. The Winn L. Rosch Hardware Bible mentioned above discusses compression hardware, methods, and applications as the subject of Chapter 15, incorporated herein by reference.

In the discussion of data compression in the Winn L. Rosch reference, both software and hardware systems for compression and decompression are discussed, including such as add-in expansion boards configured with hardware and control routines for data compression, and these and others known in the art may be suitable for data compression and decompression in the present invention.

In the present invention, in very brief terms, amplified more fully below, host computer 11, through operation of CPU 13 executing unique control routines according to the invention, prepares data for the peripheral device (such as data to form a page by a laser printer) by compressing the data with use of compression engine 19 called, accessed or controlled by the CPU, then stores the data in RAM 15. When the data is needed at the printer it is retrieved from RAM under control of the CPU, and transferred to the peripheral (laser printer 27 in this example) via data link 25. There are at least two alternative methods in embodiments of the present invention by which the compressed data may be retrieved and transferred, and both are disclosed fully below.

As was stated briefly above, the present invention has application to a number of different sorts of peripheral devices, such as, but not limited to, a high-resolution printer such as a laser printer as shown in FIG. 1 or a color laser printer; a reverse-transfer scanner; a video display device such as a cathode ray tube (CRT) display, an LCD display, or other type of flat panel display; a robotic three-dimensional output device; a media writer, such as a CD-ROM, a tape drive, or a hard disk drive, and so on.

Similarly, the data link from the host to the peripheral (25) may be any one of a number of different types of data links. For example, the link could be an industry-standard RS-232 serial link; a Universal Serial Bus™; an industry-standard Centronics™-compatible parallel port; a proprietary parallel port; an enhanced parallel port (EPP); an enhanced capabilities port (ECP) known in the art, a Small Computer Serial Interface (SCSI) bus; infra-red communication; a local area network (LAN) protocol such as Ethernet™; a wide-area network; telephone modem connection; or an Integrated Services Digital Network (ISDN) link. All of these with the exception of a proprietary parallel port are systems well-known in the industry, for which details are available to the inventor at the time of making this disclosure, from reference works and manufacturers' marketing and fact sheets. The inventor knows also of at least one proprietary parallel port system termed an Extended Enhanced Parallel Port ($E^2P^2$), for which a separate patent application has been filed.

In the present example with reference to FIG. 1, port 23 is an Enhanced Parallel Port (EPP) well-known in the art.

Compressed data is sent by the host, via port 23, to a unique peripheral controller 29, residing within the external case of laser printer 27. It is convenient for the controller to be mounted within the case of the printer, and, in other embodiments to be mounted within external enclosures and cases of other peripherals to which controllers according to the present invention may be applied. This location is not, however, required of the invention, and such unique controllers could as well be mounted outside the case of the peripheral devices they serve.

Peripheral controller 29 comprises a hardware engine for decompressing and buffering the compressed data stream sent by the host, and provides decompressed data as needed to the data-using elements of the peripheral device, in this example a laser printer 27.

In FIG. 1, peripheral controller 29 is shown as an application-specific integrated circuit (ASIC), which is preferred, but not absolutely required of the invention. The functionality of the unique peripheral controller could be implemented in other ways, such as by interconnection of discrete IC and support devices.

Peripheral controller 29 in this embodiment is an ASIC having from 80 to 100 pins, and the operating frequency is regulated by a connected clock synthesizer integrated circuit (IC) 31. Controller 29 is also connected to a small data buffer 33, in this example a 32 k by 8-bit static random-access memory (SRAM). This SRAM is used by the device controller as a buffer for incoming data, and its use and selection is described more fully below.

In the embodiment shown by FIG. 1 controller 29 also is connected to an electrically-erasable programmable read-only memory (EEPROM), also termed an $E^2$. The purpose of the $E^2$ is to store optional information in a non-volatile way, so the information cannot be lost. The optional information pre-programmed into the $E^2$ is typically information unique to the peripheral device to which the controller is applied. For example, for application to a laser printer, certain parameters of the printer engine of the laser printer, which controller 29 may need in sending decompressed data to the printer engine, may be stored in the $E^2$. In other embodiments, wherein a device controller according to the present invention may be applied to a peripheral device other than a laser printer, such as a video display, parameter information pertinent to the video display or other device may be programmed into the $E^2$.

In operation, device controller 29 receives signals 39 from sensors ($S_0$–$S_7$) that monitor equipment conditions such as paper presence, toner level, paper jam, and the like. The controller may also request information at certain times from the sensors. Device controller 29 also sends command signals to such as paper feed mechanisms, the laser printer controller, and an optional reverse-transfer scanner mechanism 37. This scanner mechanism is not a part of conventional laser printers, but an optional device contemplated by the inventors for using components of the printer as a scanner, requiring deflection of the laser beam in a manner to facilitate collecting scan information.

The handling of data in the host is not the same for all peripherals for which the dam may be dedicated. For example, for data to go to a laser printer, a request is typically initiated by a user through an application program, such as a word processing program. The user selects one or more documents to be printed, or text and/or graphics from a single document, and initiates a print command. The CPU then processes the data, organizing it typically page-by-page, and sends the data to the laser printer.

In contrast, a data stream to drive a video display is not typically under the immediate control of the user, but is transferred continuously to the video display to provide an image in real time. Moreover data for a display is also not typically processed by the host's CPU, but by a video controller that resides on an add-in video card in most cases. In the case of practice of the present invention for driving a video display, referring to FIG. 1, the CPU processes and sends information to video adapter 14 as is conventional. The video adapter, however, is unique, and includes compression engine 18 that is used by video controller 14 to compress data for storage into VRAM 16, which is then transferred via port 24 as a compressed data stream to video display 28, which comprises a unique controller according to the present invention for handling and decompressing the compressed data in real time, and using the data for forming pixels for an image on the screen of the video display.

Figure 2:
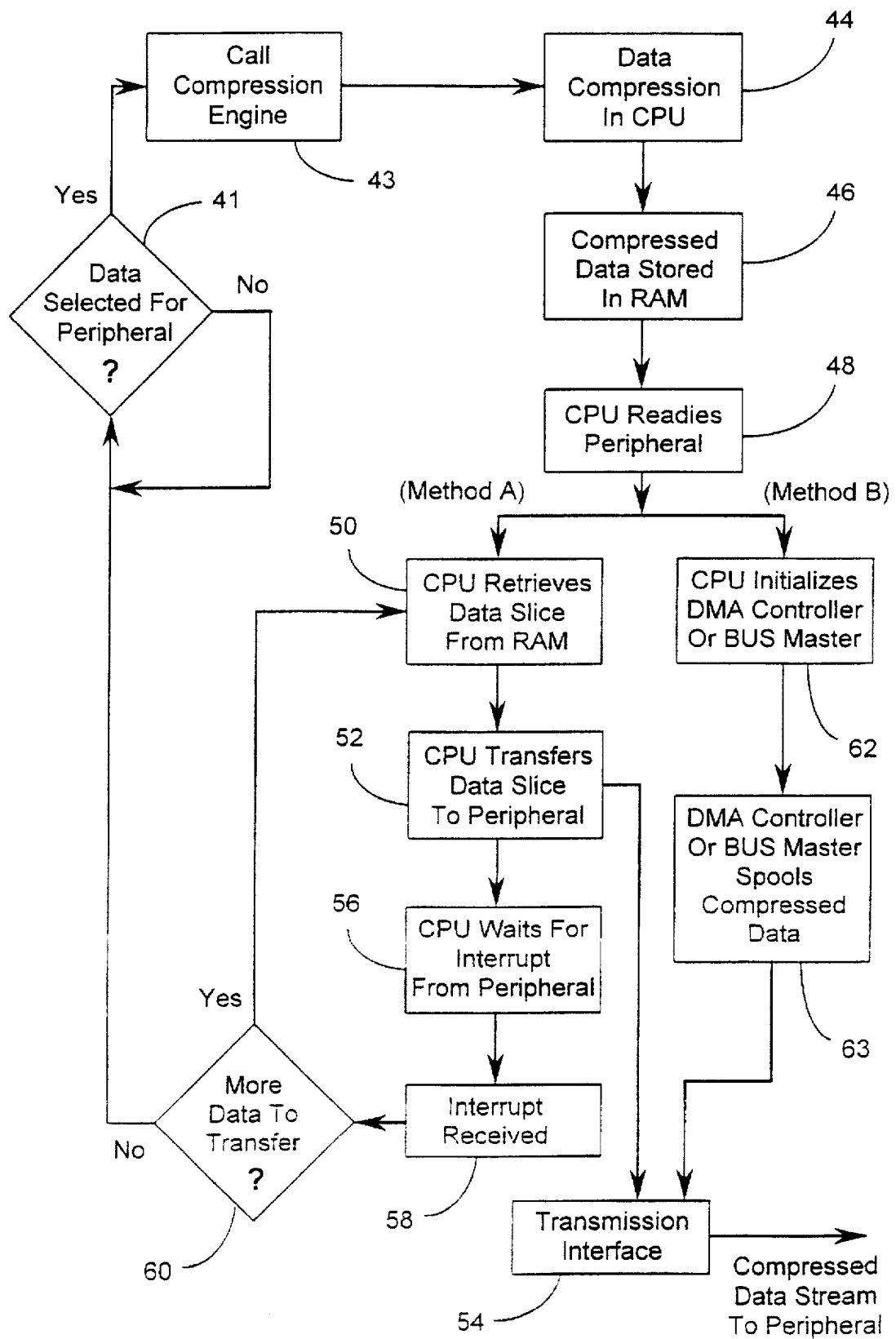
FIG. 2 is a flow diagram illustrating operation of the invention in preferred formats.

FIG. 2 illustrates a process of data handling at host computer 11 of FIG. 1 for data that will be sent to a peripheral device. In this example, the data is intended for laser printer 27, as shown in FIG. 2, but the example is not meant to be limiting to a laser printer as a peripheral device.

In step 41, data transfer is requested or initialized, which may happen in one of several different ways, such as a user input, a request from an application or operating system, or it may be a continuing process, as for a video display. As a result of the need for data, the CPU calls (or activates) compression engine 19 at step 43 and compresses selected data at step 44. This may be a software process, hardware process, or a combination of both, according to the nature of the compression engine used. The compressed data is temporarily stored at step 46 in RAM 15 (FIG. 1) for subsequent transfer in compressed form to the peripheral, in this case laser printer 27. The CPU then readies (initializes) the peripheral at step 48.

The process from step 41 to step 48 may not be an entirely serial process. Given a large number of pages of text or a large amount of graphic data, steps may be performed in parallel. That is, after compressing one page the CPU may go on to step 48 and initialize the peripheral, while also compressing and storing another page as operating priority and availability permits.

Beyond step 48 there two alternative paths by which the data may actually be transferred to the peripheral device, in this example laser printer 27 of FIG. 1. One alternative is along the path labeled method A in FIG. 2 to step 50. In this alternative, the CPU retrieves a discrete data slice from RAM, transfers that slice to the peripheral at step 52 through transmission interface 54, and then waits at step 56 for an interrupt request from the peripheral signalling the peripheral is ready for more data. When the interrupt is received at step 58, flow goes to step 60 where it is determined if there is more data to go to the peripheral. If yes, flow returns to step 50, and another slice is retrieved and transferred. If all data has been transferred (NO at step 60) flow returns to step 41 to await a need for more data transfer.

An alternative method of transfer is illustrated by the path labeled Method B following step 48. In this path the CPU initializes a direct memory access (DMA) controller or a bus master controller at step 62, identifying the data to be sent and to which peripheral device. The DMA controller or bus master then takes over the process from the CPU, spools the data from RAM at step 63, and transfers the data to the peripheral through transmission interface 54.

In the case of operation of the present invention with a video display, the processes are quite similar to the processes described above relative to FIG. 2, except the CPU simply directs data to a video memory, as is conventional, and a unique video adapter compresses the data, stores it temporarily in video RAM, and transfers the compressed data as needed to the video display. This is not to say, however, that a dedicated video adapter is absolutely necessary in practicing the present invention. A video display might also be driven by the host CPU as described for other peripherals herein.

It remains to describe in more detail the operations of the unique peripheral controller (device controller 29 of FIG. 1) in receiving compressed data, decompressing the data, and providing the data as required to the elements of the peripheral device requiring uncompressed data.

Figure 3:
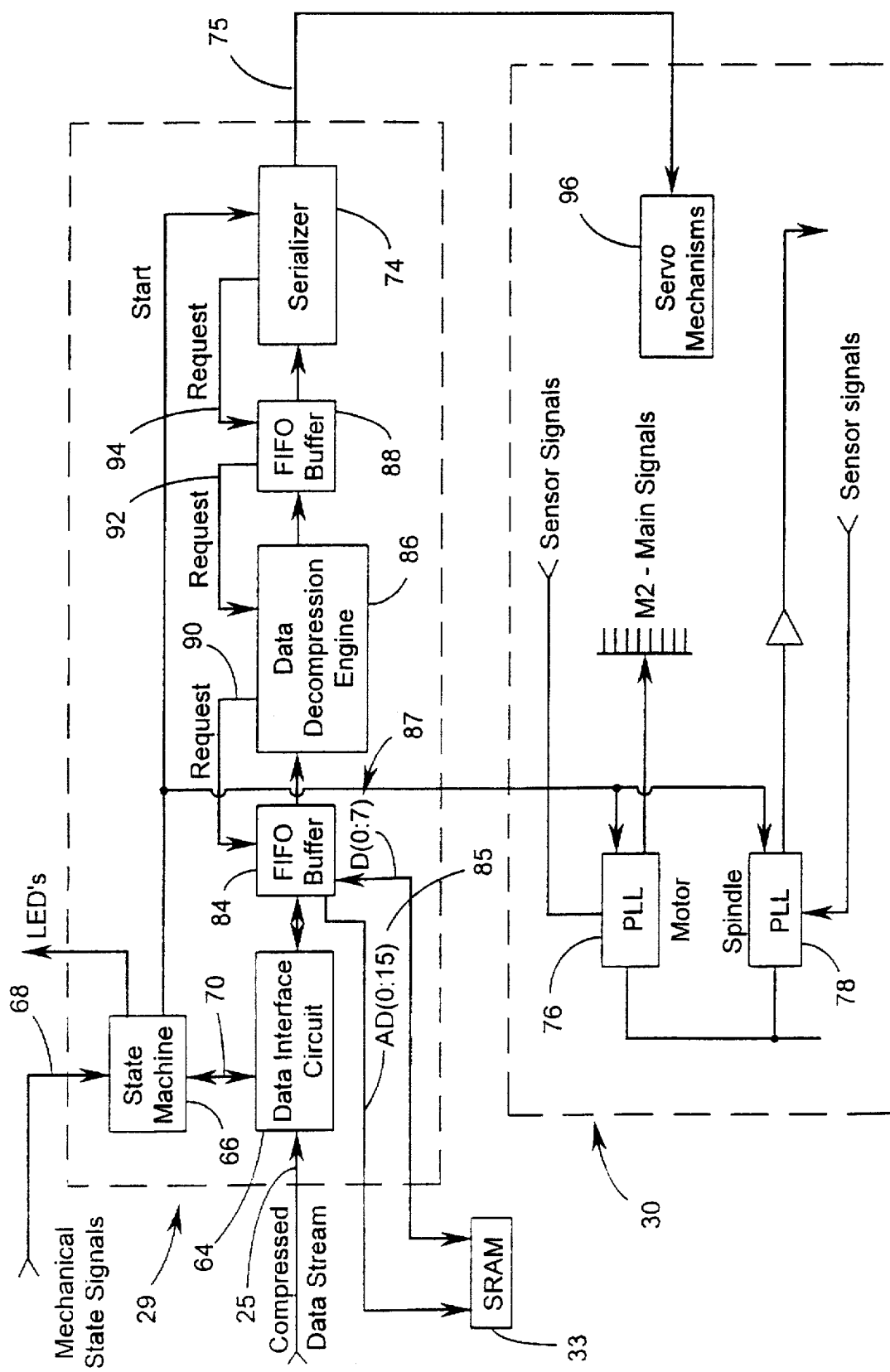
FIG. 3 is a block diagram illustrating architecture of a peripheral device controller according to a preferred embodiment of the invention.

FIG. 3 illustrates a more detailed architecture for device controller 29, still following the example of control for a laser printer. In FIG. 3 a dotted line encloses those elements that are, in this embodiment, a part of device controller 29, and another dotted line encloses those elements 30 that are properly a part of a more conventional laser printer. As described above, however, as a matter of convenience, the peripheral device controller of the invention will be typically mounted within the external case of the peripheral which it serves.

In FIG. 3, a compressed data stream on link 25 from the host, as a result of data transfers described relative to FIG. 2, is received at a data interface circuit 64 which comprises one or more data registers. This circuitry responds to a signal from the host on link 25 to latch data presented on the link, and also issues an interrupt to the host when data has been transferred on from interface 64 and the interface is ready for more data. For the example of a laser printer, and for other printers as peripherals, link 25 will typically be the well-known 25-pin Centronics-type link, and the signals just described will be those normally used in that protocol for the purposes described.

Other sorts of data links than the Centronics type may well be used in some embodiments, however. For example, a serial protocol may be used, and appropriate modulation will be a part of circuit 64 in that case.

A state machine 66 is used in device controller 29 to monitor state signals from the peripheral device and to issue appropriate signals to initiate specific actions and processes. The state machine, for example, is connected to sensors (Mechanical state signals 68) which monitor the state of physical mechanisms of the laser printer. For this example of a laser printer, these include such as paper presence, toner level, paper jam and the like. Although it appears in the figure that these signals originate outside the controller and the laser primer, they actually originate in the laser printer section 30.

Data interface circuit 64 also signals state machine 66 on link 70 when data is present to be transferred. If data is ready and all incoming state signals indicate a ready state, the state machine signals the data interface circuit on link 70 to move the data to buffer 84. The state machine also issues a start signal on line 72, which goes to a data serializer circuit 74 and also to two phase-locked-loop (PLL) circuits 76 and 78, which drive the motor and spindle of the laser printer as is well-known in the art.

State machine 66 also controls, in this example, a set of LEDs on lines 80, which are used to provide a visual display for an operator of the state of the laser printer. A set of LED signals may be organized as:

Green flashing=Operation in progress
Green steady=Ready
Red flashing=Failure
Yellow=Paper Jam The LEDs in this example may be separate red, yellow and green LEDs, or tri-state LEDs.

In alternative embodiments for other peripherals and purposes, there may be more than the one state machine shown.

Data serializer circuit 74 receives, as stated above, a start signal from state machine 66, and also receives mechanism signals from elements of the laser printer, such as a paper ready signal on line 82.

Data serializer 74 is at the end of a data pipeline that includes, in sequential order, data interface circuit 64, a first-in-first-out (FIFO) buffer memory 84 including SRAM 33 to which it is connected by both address and data buses 85 and 87, a data decompression engine 86, a second, post-decompression FIFO buffer 88, and then serializer 74. Data decompression engine 86 has a request line 90 for requesting data from FIFO buffer 84 as it is ready for data.

FIFO buffer 88 has a request line 92 for requesting data from decompression engine 86, and serializer 74 has a request line 94 for requesting data from FIFO buffer 88. When data serializer 74 receives a start from state machine 66 and the necessary ready signals from such as the paper ready signal on line 82, it issues a request for data from buffer 88. If buffer 88 has data it provides it to the sefializer, or, if not, it issues a request on line 92, and so forth. In this manner, each station in the pipeline requests and processes data and passes it on, and the buffers provide the needed function of evening out the data flow for the rate required by the serializer.

The serializer passes the data on line(s) 75 to a peripheral servo controller 96 in the present example. In the case of a laser printer, the servo controls the on-off cycles of a laser whose beam is deflected typically by a spinning minor to strike points in a line on a drum. The laser beam striking the drum alters the electrical charge at points on the drum in a pattern that becomes a bit-map for attracting toner that is subsequently transferred to paper fed past the drum in the well-known laser printing process.

FIFO buffer 84 in this example is a FIFO controller connected to 32K×8-bit SRAM 33, which is not a part of controller 29. The SRAM actually performs the storage function. There is some discretion here in the size and functionality required, which depends to some extent on the slice size used by the host in transferring compressed data to the peripheral device controller. A slice is an arbitrary quantity of data, consisting of from one to several bytes. The size of a slice is a design function for the present invention. If a slice is relatively large, then SRAM 33 will need be relatively large (and therefore more expensive), but the CPU will be needed less often in the transfer operations, because more data will be transferred with each burst. If the slice size is made smaller, the CPU is more burdened, but a smaller SRAM may be used, or, in some cases, registers as a part of controller 29 may be used without an externally connected memory device. The determination of these characteristics is a matter of different applications and different peripherals.

FIFO buffer 88 is shown in this example without connection to an external SRAM, and is implemented with registers as a part of controller ASIC 29. Post-decompression FIFO buffer 88 does not need to be as large as the pre-decompression buffer, so an externally-connected memory device will not typically be needed.

In operating other peripheral devices the serializer feeds data to whatever servo or other mechanism or circuitry requires the data to operate in the expected manner. For example, in an application for driving a cathode ray tube (CRT) video display, the data stream, decompressed, will be the video data stream used after analog conversion for turning a cathode ray on and off to form pixels on a screen to form an image. Other purposes in other peripheral devices will be apparent to those with skill in the art. Some further description here, however, is seen as necessary to explain other uses than the embodiment described for a laser printer.

Figure 4:
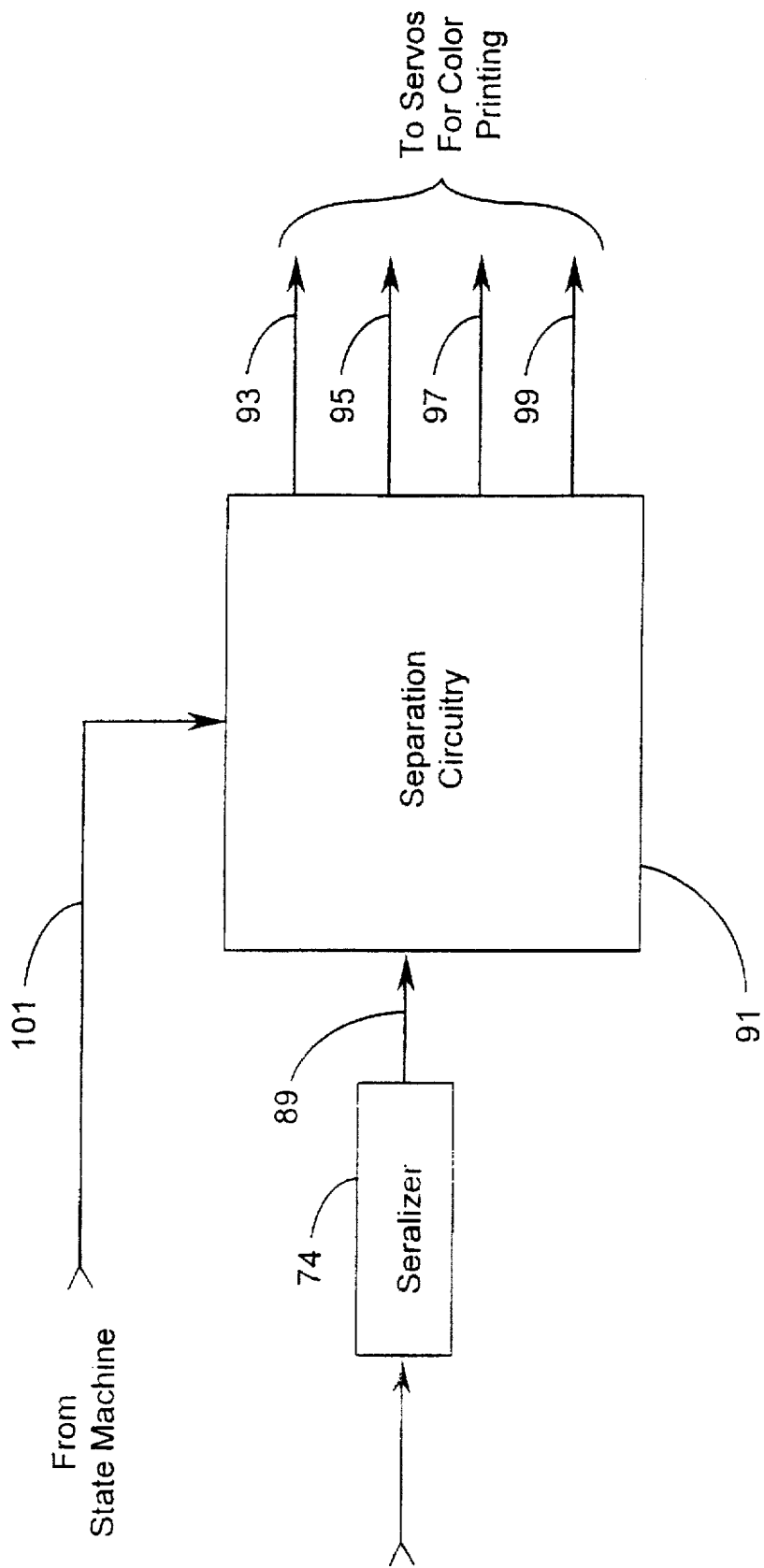
FIG. 4 is a block diagram illustrating separation circuitry in an embodiment of the invention for operating a color laser printer.

Consider, for example, the peripheral device controller for use in driving a color laser printer. A color laser printer requires not one, but four data streams, one stream for black, and three for color. It is not necessary, however, to provide four compressed data streams from the host to the peripheral controller. One compressed data stream will suffice. FIG. 4 shows additional detail that will be needed for a color laser printer. Serializer 74 at the end of the decompression pipeline of FIG. 3 provides a decompressed data stream on link 89 to a separation circuitry 91 which is dedicated to separating the integrated data stream into four separate data streams 93, 95, 97, and 99 for driving the separate servo mechanisms for a color laser printer. Control signals from state machine 66 of FIG. 3 connect to separation circuitry 99 on path 101.

In the case of a monochrome CRT video display, one data stream will suffice, except the data stream has to be transformed from digital to analog to control the single CRT beam necessary for the CRT display. This architecture is illustrated in FIG. 5A, showing serializer 74 supplying a decompressed data stream on link 102 to a digital-to-analog (D/A) conversion circuit 103, whose output 105 goes to beam circuitry of the monochrome display. Control signals from the state machine are connected on path 104.

In the case of a color CRT video display, three beams are typically used, and the decompressed data stream has to be separated as well as converted to analog signals from the separated streams. FIG. 5B shows this circumstance, wherein serializer 74 provides a decompressed data stream on link 107 to a separator 109, which provides three separated data streams on paths 111, 113, and 115. The separated data streams each have a D/A converter (117, 119, and 121), which in turn provide analog signals to the beam circuits. Control signals from state machine 66 are connected on path 108.

It will be apparent to those with skill in the art that there are many other similar examples of separation and conditioning that will be needed depending on application details for a decompressed data stream from a device controller according to the present invention. These alterations or additions are well within the abilities of those with skill in the art without providing any further inventive input. Of course, such separation and conditioning may be provided as a part of an ASIC comprising the peripheral device controller, or may be added with discrete circuits or another ASIC after the peripheral device controller.

As was stated briefly in several places above, there is a wide variance in the variety of host computers and in peripheral devices that may be combined in the present invention with the unique hardware of a peripheral device controller according to the invention, and with the unique process of data compression, transfer, and decompression according to the invention. The peripheral device controller described by the examples given has in a single embodiment a state machine with plural state signal inputs (FIG. 3, signals 68), status outputs (80), ready signal input (82), start signal outputs (72), and an uncompressed data stream output 75.

In the one configuration, such a device controller may be applied to a very large number of peripheral devices, including all of the types described above, and others. In some cases, there may be a need for such a device controller which a generic controller according to the invention may not fill. In these instances special editions may be designed and manufactured to fill special needs, still retaining the unique functionality of the invention; that is, receiving a compressed data stream, handling the data through a decompression and buffer pipeline, and providing an uncompressed data stream for the purposes of the peripheral to which such a design may be dedicated; while also providing for integrating the data stream with other functions of the peripheral device. In an alternative embodiment, parts of the device controller ASIC may be programmable by methods known in the art to provide altered functionality for differing applications and purposes. In these embodiments, programmability may be provided in a number of conventional ways, including by input from the host.

It will also be apparent to those with skill in the art that there are many alterations that may be made in elements and processes of the embodiments of the invention described above without departing from the spirit and scope of the invention. For example, different designers may implement the circuitry of the state machine, the data interface circuitry, the buffers, the data decompression engine, and other parts of the peripheral device controller of the invention in many different ways, without departing from the nature of the invention. There are similarly a variety of ways to compress the data at a host, and variations in the way the compressed data may be stored, accessed, and transferred to the unique peripheral controller.

There are, as was previously mentioned, a wide variety of data links that may be used between a host and a peripheral device controlled by a peripheral controller according to an embodiment of the present invention.

What is claimed is:

1. A computer, comprising:

a CPU;

a memory;

a video adapter having a video controller, a compression engine, video random-access memory (VRAM), and a data interface to a video display, all connected by a video bus;

a bus system connecting the CPU, the memory, and the video adapter; and control routines executable by the video controller for processing and sending data to the data interface;

wherein the video controller, executing the control routines, compresses data using the data compression engine, stores the compressed data in the VRAM, and retrieves and sends the compressed data to the data interface.

2. A computer as in claim 1 wherein the data interface is a Video Graphics Array (VGA)-compatible data interface.

3. A video adapter, comprising:

a video controller;

a video random access memory (VRAM);

a compression engine;

a data interface to a video display;

a local bus connecting the video controller, the VRAM, the compression engine, and the data interface; and control routines executable by the video controller for handling data and sending the data to the data interface for transfer to the video display;

wherein the video controller, executing the control routines, compresses data using the data compression engine, stores the compressed data in the VRAM, and retrieves and sends the compressed data to the data interface for transfer to the video display.

4. A video adapter as in claim 3 wherein the video adapter is compatible with Video Graphics Adapter (VGA) standards.

5. A video adapter as in claim 3 wherein the adapter is an add-in expansion card adaptable to an expansion port of a computer expansion bus.

* * * * *